US006724410B2

(12) United States Patent
Arai

(10) Patent No.: US 6,724,410 B2
(45) Date of Patent: Apr. 20, 2004

(54) MULTICOLOR IMAGE FORMING APPARATUS HAVING A CONTROLLER FOR CONTROLLING PRESS-CONTACT AND SEPARATION OF AN IMAGE FORMING MEMBER

(75) Inventor: Hiroyuki Arai, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/023,402

(22) Filed: Dec. 18, 2001

(65) Prior Publication Data

US 2002/0080220 A1 Jun. 27, 2002

(30) Foreign Application Priority Data

Dec. 26, 2000 (JP) ....................................... 2000-394646

(51) Int. Cl.[7] ......................... B41J 2/385; G01D 15/06; G03G 15/01

(52) U.S. Cl. ......................... 347/115; 399/178; 399/302

(58) Field of Search ................................. 399/302, 299, 399/178, 179; 347/261, 232, 115, 118

(56) References Cited

U.S. PATENT DOCUMENTS 4,558,356 A * 12/1985 Toda et al. ................. 347/115
5,303,018 A * 4/1994 Terada et al. ............... 399/299
5,319,537 A * 6/1994 Powers et al. .............. 347/232
5,541,634 A * 7/1996 Otsuka et al. .............. 347/232
5,893,017 A * 4/1999 Yamamoto .................. 399/299
6,121,997 A * 9/2000 Fukushima ................. 347/261
6,204,867 B1 * 3/2001 Fujimoto et al. ........... 347/118
6,356,732 B1 * 3/2002 Watanabe et al. ........... 399/299
6,470,166 B2 * 10/2002 Mizoguchi et al. ......... 399/302

FOREIGN PATENT DOCUMENTS

JP 03018870 A * 1/1991 .......... G03G/15/01

* cited by examiner

*Primary Examiner*—Susan S. Y. Lee
(74) *Attorney, Agent, or Firm*—Frishauf, Holtz, Goodman & Chick, P.C.

(57) ABSTRACT

A multicolor image forming apparatus comprises a first image forming unit, and a second image forming unit, having respectively an image forming member, an intermediate transfer member, and a secondary transfer section for transferring the toner image from the intermediate transfer member onto a recording material, wherein there are provided a priority mode setting section for setting a multicolor priority mode or a monochrome priority mode, and a controller to control in such a way that in an idling condition and in a waiting condition, when the multicolor priority mode is set, all of the image forming members are in press-contact with the intermediate transfer member, and when the monochrome priority mode is set, only the image forming member of the first image forming unit is in press-contact with the intermediate transfer member.

7 Claims, 5 Drawing Sheets

FIG. 4 ( a )
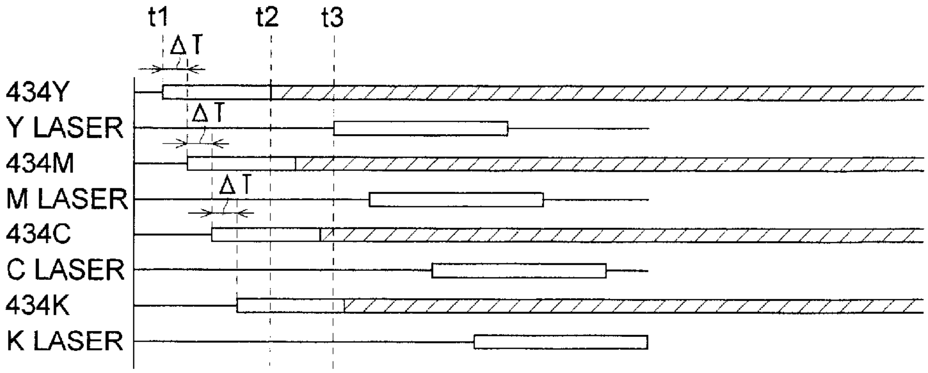
FIG. 4 ( b )
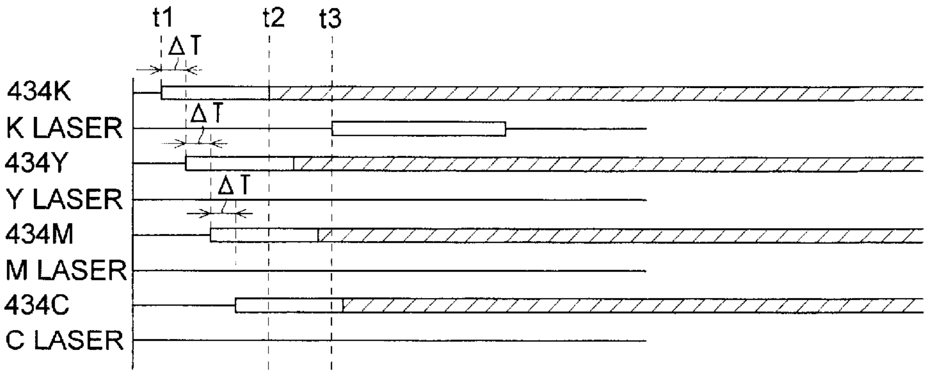

MULTICOLOR IMAGE FORMING APPARATUS HAVING A CONTROLLER FOR CONTROLLING PRESS-CONTACT AND SEPARATION OF AN IMAGE FORMING MEMBER

BACKGROUND OF THE INVENTION

The present invention relates to a multicolor image forming apparatus, and in particular, to control of press-contact/separation of an image forming member of an image forming unit which forms a multicolor image such as a full color image by compounding monochromatic toner images each being yellow (Y), magenta (M), cyan (C) or black (B) in color with an intermediate transfer member, and to control of a polygon mirror in an exposure device in each image forming unit mentioned above, in a multicolor image forming apparatus.

In a prior art:

(1) An image forming member in an image forming unit which forms a toner image for each of Y, M, C and K and an intermediate transfer member move in a press-contact condition, then, toner images of respective colors are transferred onto the intermediate transfer member to be superimposed on it, and a color toner image is formed. The color image forming process in which the toner image is formed as mentioned above is performed via a preparation process, in which the image forming member of each image forming unit is subjected to press-contact with the intermediate transfer member, before the image forming process.

(2) In a laser image forming apparatus such as a laser printer whose light source is a laser diode, an image writing is performed by a scanning exposure on the image forming member that is conducted with a light beam from a laser light source deflected by a polygon mirror. A motor which drives the polygon mirror is a high speed motor having a speed of tens of thousands of rotations per minute, and the considerable amount of rush currents flow therethrough when it starts. Further, it takes a few seconds for rising up from the start of rotation of the polygon mirror to its constant speed rotation.

The followings are problems to be solved by the invention.

(1) Incidentally, most of the full color image forming apparatus representing the typical example of the multicolor image forming apparatus are used as an apparatus of forming a black and white image representing a monochromatic image, however, in a waiting condition of the conventional multicolor image forming apparatus, the press-contact condition of the image forming member with the intermediate transfer member has been established unconditionally. Therefore, the preparation time has been requested when a full color image forming process is started from the waiting condition, or when a black and white image forming process is started from the waiting condition. Due to this, there has been a problem that the time from pressing an image forming button or from sending an image formation starting order by an external device such as a personal computer to outputting a first sheet of image, that is, a first copy-out time or first print-out time (hereinafter referred to as FCOT) becomes longer.

In the waiting condition, for example, in the construction wherein the image forming member of the image forming unit for K image and the intermediate transfer member are set to be in press-contact condition, while other image forming bodies and the intermediate transfer member are set to be in non-press-contact condition, there is required a preparation process in which the image forming bodies for Y image, M image and C image and the intermediate transfer member are subjected to be in press-contact condition, before the full color image forming process, and accordingly, it takes ten-odd seconds for this process, which means long FCOT.

The first object of this invention is to provide a multicolor image forming apparatus having short FCOT, by solving the above-mentioned problem in the conventional multicolor image forming apparatus.

(2) In the conventional multicolor image forming apparatus such as, for example, the full color image forming apparatus, the polygon mirrors of the exposure devices for Y image, M image, C image and K image have been started at the same time. Due to this, a rush current becomes larger, and a power supply that can comply with the large rush currents is necessary, which has caused a cost increase.

The second object of this invention is to provide a low-cost image forming apparatus, by solving the above-mentioned problem in the conventional multicolor image forming apparatus.

(3) In the example of the full color image forming apparatus, when there is employed the starting method wherein the polygon mirrors of the exposure devices respectively for Y image, M image C image and K image are started in succession at intervals of time, the polygon mirror of the exposure device for K image is started lastly.

When the black and white image formation is performed by the conventional full color image forming apparatus, the polygon mirror for K image is started lastly from the order for the start of image formation, after the polygon mirrors for Y image, M image and C image are started, and therefore, the starting time for the polygon mirror for K image is delayed, which causes a problem of longer FCOT.

The third object of this invention is to provide a multicolor image forming apparatus having short FCOT, by solving the problem that FCOT becomes longer in the black and white image forming by the multicolor image forming apparatus.

SUMMARY OF THE INVENTION

The above-mentioned objects of the invention are attained by the following invention.

(1) A multicolor forming apparatus, which has therein a first image forming unit for a first image having an image forming member, an image forming means for forming a toner image on the image forming member, and a primary transfer means, a second image forming unit for a second image having an image forming member, an image forming means for forming a toner image on the image forming member, and a primary transfer means, an intermediate transfer member carrying a toner image that is transferred from the image forming member by the primary transfer means, and a secondary transfer means for transferring a toner image on the intermediate transfer member onto a recording material, and performs a multicolor image forming process in which all of the image forming bodies are subjected to press-contact with the intermediate transfer member to form an image or a monochromatic image forming process in which only the image forming member of the first image forming unit is subjected to press-contact with the intermediate transfer member to form an image, wherein there are provided a priority mode setting means by which a multicolor priority mode and a monochrome priority mode are set and a control means which controls so that all of the image forming bodies are subjected to press-contact with the intermediate body in an idling condition and a waiting condition, when the multicolor priority mode is set, and only the image forming member of the first image forming unit is subjected to press-contact with the intermediate transfer member in an idling condition and a waiting condition, when the monochrome priority mode is set.

(2) The multicolor image forming apparatus described in (1) wherein the primary transfer means is composed of a transfer roller to which a transfer voltage is applied, and the image forming member is press-contacted with and separated from the intermediate transfer member, by the displacement of the transfer roller.

(3) The multicolor image forming apparatus described in (1) or (2) wherein the control means controls the separation of the image forming member except the image forming member of the first image forming unit from the intermediate transfer member, when the waiting condition has been kept for the prescribed time period.

(4) A multicolor image forming apparatus wherein there are provided an exposure device for a first image and an exposure device for a second image having respectively a laser light source and a polygon mirror which deflects a light beam from the laser light source, and a control means which controls the starts of the exposure device for the first image and the exposure device for the second image so that they may start in succession at the time intervals.

(5) The multicolor image forming apparatus described in (4) wherein the control means makes the polygon mirror of the exposure device for the first image to start lastly when a first image is a multicolor image, and makes it to start first when a first image is a monochromatic image.

(6) A multicolor image forming apparatus having the exposure device for the first image and the exposure device for the second image having respectively a laser light source and a polygon mirror which deflects the beam from the laser light source, and a time setting means which sets an automatic shut-off time to shut off the polygon mirror, wherein the time setting means can set an automatic shut-off time of the polygon mirror of the exposure device for the first image and an automatic shut-off time of the polygon mirror of the exposure device for the second image to be different each other in terms of a value.

Each of FIG. 4(*a*) and FIG. 4(*b*) is drawing showing start timing of a polygon of the embodiment of the invention.

Figure 5:
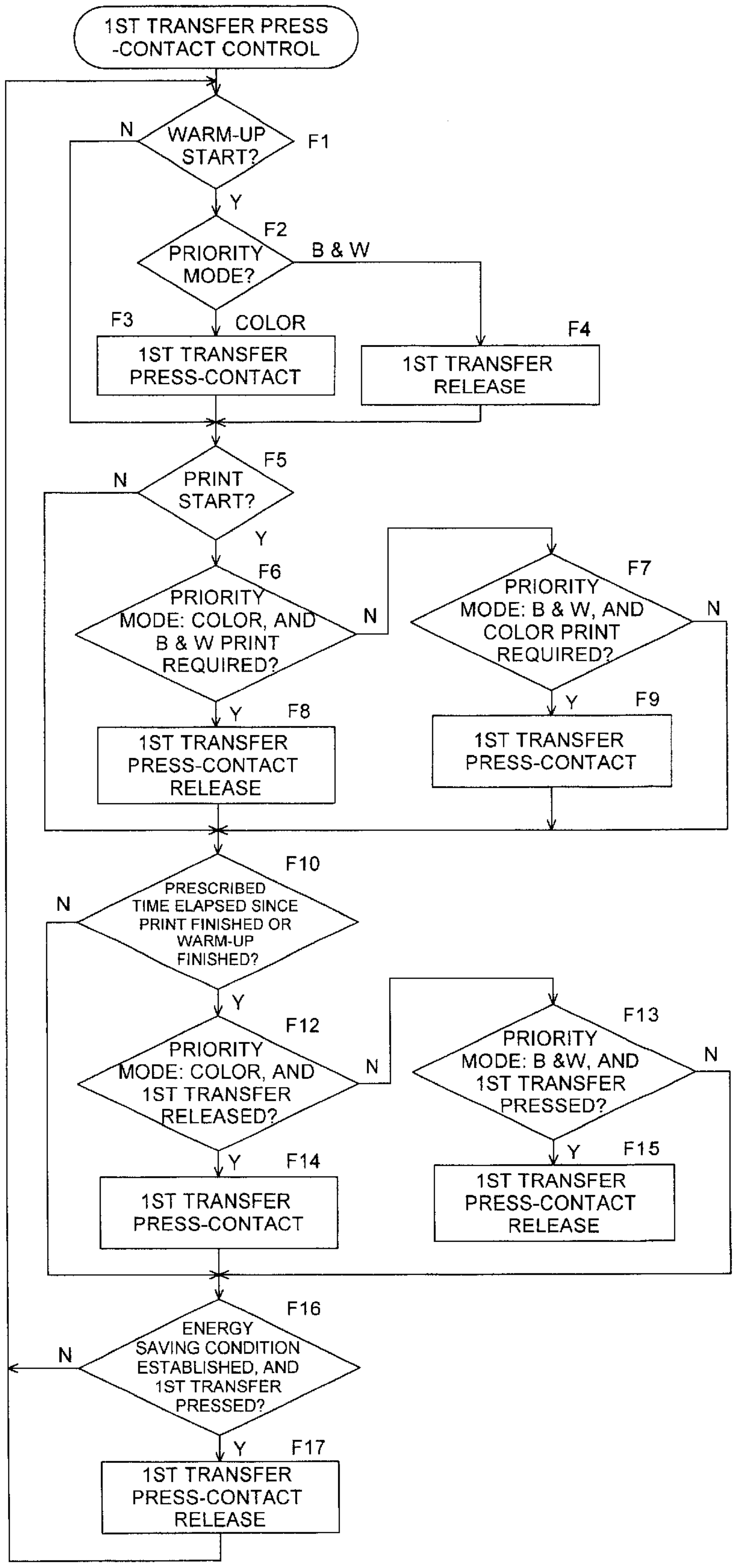

FIG. 5 is a flow chart of a primary transfer press-contact control of the embodiment of the invention.

Figure 6:
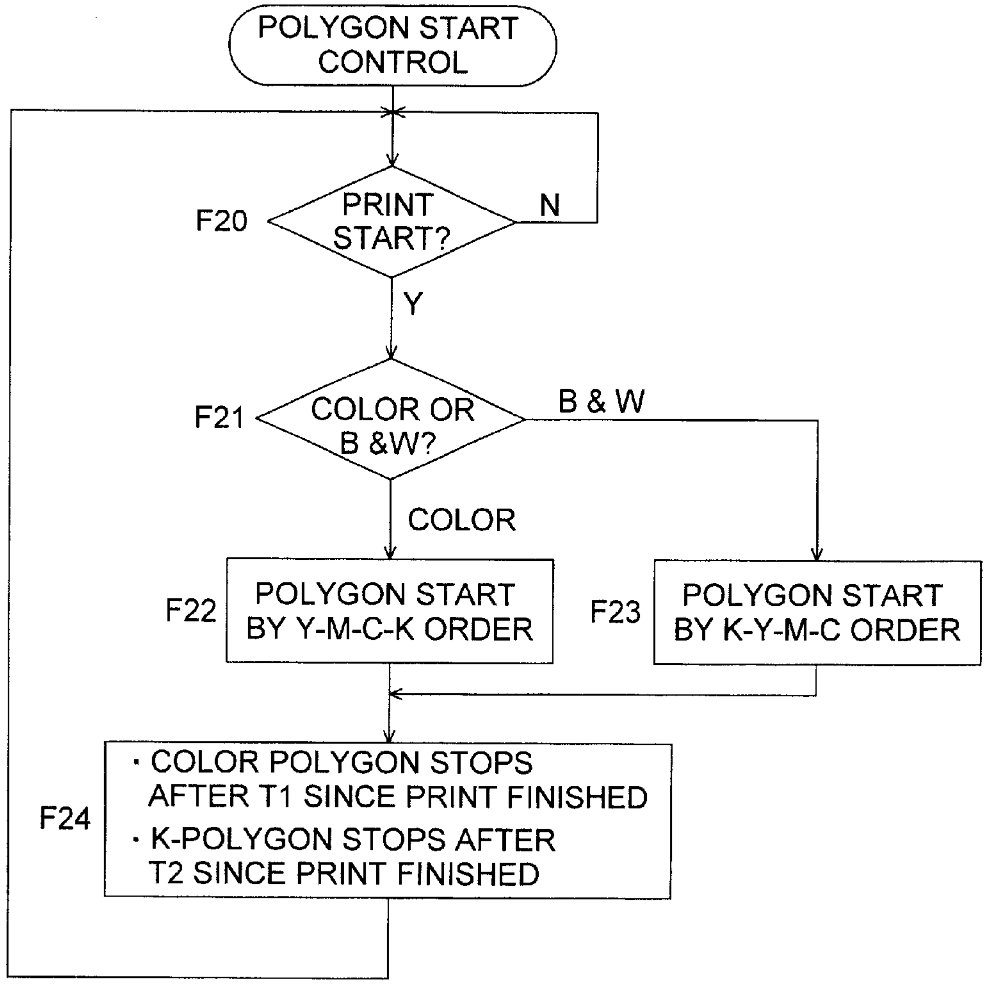

FIG. 6 is a flow chart of a polygon start control of the embodiment of the invention.

DETAILED DESCRIPTION OF THE PREFERRED EMBODIMENT

Figure 1:
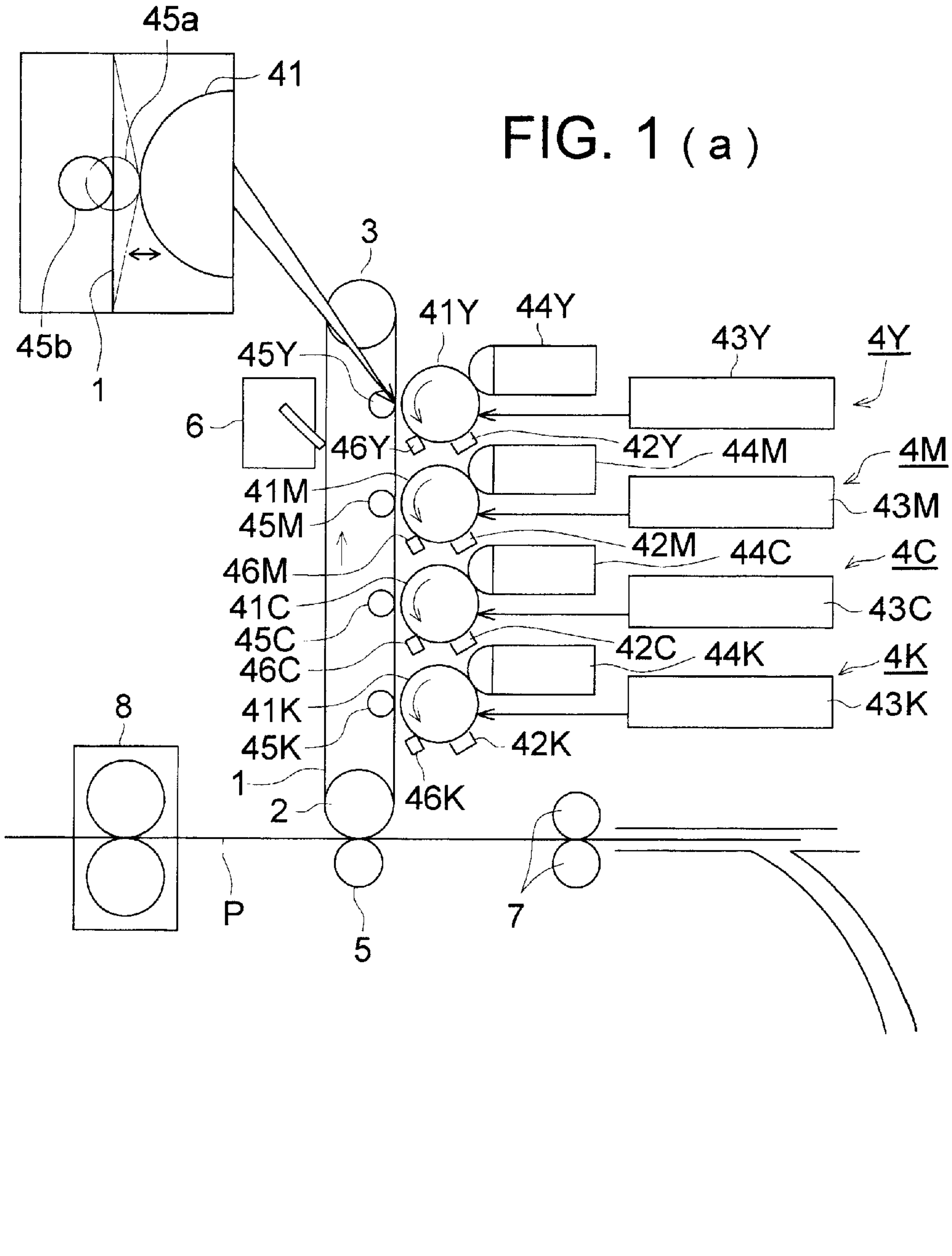
FIG. 1(*a*) and FIG. 1(*b*) are drawings showing a multicolor image forming apparatus of the embodiment of the invention.

FIG. 1 shows a multicolor image forming apparatus which forms a full color image representing one example of a multicolor image relating to the embodiment of the invention, and FIG. 1(*a*) shows a total construction.

Indicated by numeral 1 is an intermediate transfer member composed of a semi-conductive belt, which is trained tightly about drive roller 2 and driven roller 3 to rotate in the direction shown by an arrow. Indicated by symbol 4Y is a second image forming unit for a yellow (hereinafter referred to as Y) image representing a second image, and the second image forming unit has drum-shaped photoreceptor 41Y representing an image forming member, charging device 42Y which charges the photoreceptor 41Y evenly, exposure device 43Y which exposes the photoreceptor 41Y through scanning, developing device 44Y which develops an electrostatic latent image on the photoreceptor 41Y, transfer device 45Y representing a primary transfer means which transfers an yellow toner image on the photoreceptor 41Y onto the intermediate transfer member 1, and cleaning device 46Y.

Though well-known and optional photoreceptors are used as the photoreceptor 41Y, it is preferable to use OPC photoreceptor having a negative charging characteristic. For the charging device 42Y, there are used known ones such as a corotron charger, a scorotron charger and a roller charger. For the exposure device 43Y, a scanning exposure device having a laser light source such as a laser diode, and a polygon mirror (hereinafter referred to as a polygon) which forms the scanning light beam by deflecting the light beam from the laser light source, is used. For the developing device 44Y, it is preferable to use the developing device in which the toner adheres to the exposed section of the photoreceptor 41Y through a reversal developing method, though known and optional developing devices are used.

A transfer roller on which transfer voltage is applied is used for the transfer device 45Y. Since each of second image forming unit 4M forming a magenta (hereinafter referred to as M) toner image representing a second image, second image forming unit 4C forming a cyan (hereinafter referred to as C) toner image representing a second image, and first image forming unit 4K forming a K toner image representing a first image is composed respectively of the same construction as in the image forming unit 4Y, each of symbols M, C and K is given to each of the photoreceptor, the charging device, the exposure device, the developing device, the transfer device representing the primary transfer means and the cleaning device, to be after the same figure given to each of them.

A Y toner image, an M toner image, a C toner image and a K toner image which are transferred respectively from the image forming unit 4Y, 4M, 4C and 4K, are transferred and superposed on the intermediate transfer member 1 to form a color toner image. Indicated by numeral 5, which is a transfer device representing a secondary transfer means, transfers the color toner image on the intermediate transfer member 1 onto recording material P. The well known and optional transfer device such as a transfer roller on which the transfer voltage is applied, and a corotron charging device, are used for the transfer device 5. Indicated by numeral 6 is a cleaning device which cleans the intermediate transfer member 1. Indicated by numeral 7 represents pared registration rollers which convey the recording material P in synchronization with the formation of the toner image on the intermediate transfer member 1, and indicated by numeral 8 is a fixing device in which the color toner image on the recording material P is fixed by heating.

FIG. 1(*b*) shows the enlarged movement of the transfer devices 45Y, 45M, 45C and 45K. The symbols of Y, M, C and K are omitted to show the transfer devices, because the construction of the transfer device for each color image is the same as others. The transfer device 45 press-contacts the intermediate transfer member 1 to the photoreceptor 41 (the photoreceptors 41Y, 41M, 41C and 41K are named generically). The transfer device 45 is able to change the position from transfer position 45*a* shown by a dotted line to resting position 45*b* shown by a solid line where the intermediate transfer member 1 is released from the photoreceptor 41.

Figure 2:
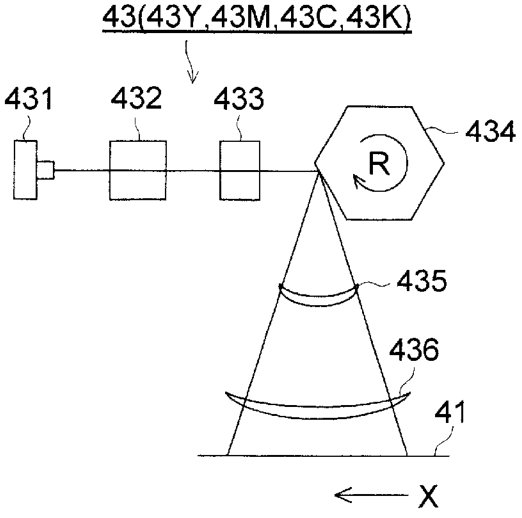
FIG. 2 is a drawing showing an exposure device of the embodiment of the invention.

FIG. 2 shows the construction of exposure devices 43Y, 43M, 43*c* and 43K. The symbols Y, M, C and K are omitted to show the exposure devices, because the construction of the exposure device for each color image is the same as others. The exposure device 43 is composed of laser diode 431 representing a laser light source, collimator lens 432, first cylindrical lens 433, polygon mirror (hereinafter referred to as a polygon) 434, fθ lens 435 and second cylindrical lens 436. The polygon 434 rotates at high speed in the direction shown by arrow R, and performs the scanning exposure by deflecting the light beam emitted by the laser diode 431 to the direction shown by arrow X.

Figure 3:
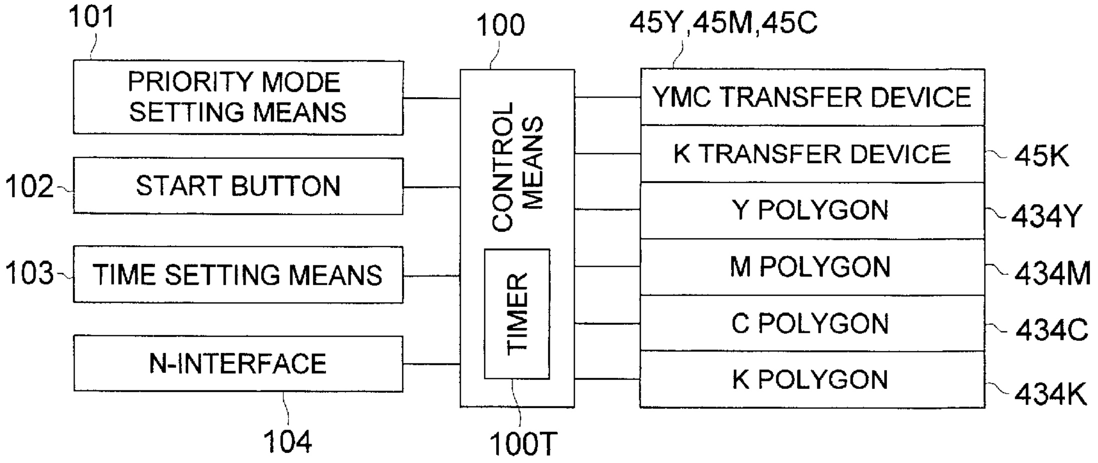
FIG. 3 is a block diagram of a control system of the embodiment of the invention.

FIG. 3 shows a block diagram of a control system of a multicolor image forming apparatus of the embodiment of the invention.

Indicated by numeral 100 is a control means composed of microcomputers. The control means 100, having timer 100T, uses this timer to perform an automatic shut-off control and a control of shifting to an electric energy saving mode, both of which will be explained later.

Indicated by numeral 101 is a priority mode setting means which is provided in an operating section (not shown), and establishes a full color priority mode representing a multicolor priority mode and a black and white priority mode representing a monochrome color priority mode.

As explained later, the priority mode is a mode wherein there is established whether to prepare, in a waiting period, the situation of being possible to start the full color image forming process representing the multicolor image forming process immediately, or to prepare, in a waiting period, the situation of being possible to start the black and white image forming process representing the monochrome image forming process immediately. A user who frequently forms a full color image sets priority mode setting means 101 to the full color priority mode, while a user who frequently forms a black and white image sets to the black and white priority mode. When the full color priority mode is set, the control means 100 moves the transfer devices 45Y, 45M and 45C to the position of the dotted line shown in 45*a* of FIG. 1(*b*) in the waiting condition, and controls so that all of the photoreceptors 41Y, 41M, 41C and 41K may be kept in the state of press-contact with the intermediate transfer member 1. When the black and white priority mode is set, the control means 100 moves the transfer devices 45Y, 45M and 45C to the position of the solid line shown in 45*b* of FIG. 1(*b*) in the waiting condition, and makes the photoreceptors 41Y, 41M and 41C to be separated from the intermediate transfer member 1 so that they are kept in the non-press-contact position, while the control means 100 moves only the transfer device 45K to the position of the dotted line shown in 45*a* so that only the photoreceptor 41K may be kept in the press-contact condition with the intermediate transfer member 1.

As it is clear by the above-mentioned explanation, the transfer device 45K is in the press-contact condition in the waiting condition, in any of the full color priority mode and the black and white priority mode. That is, in the present embodiment of the invention, the photoreceptor 41K is always press-contacted with the intermediate transfer member 1.

The control means 100 also controls the sequential start of polygon 434Y of the exposure device 43Y, polygon 434M of the exposure device 43M, polygon 434C of the exposure device 43C and polygon 434K of the exposure device 43K.

Indicated by numeral 102 is a start button, by the operation of this button, the control means 100 starts the image formation, that is, starts printing or copying. The case of the printing will be explained for the example as follows.

Indicated by numeral 103 is a time setting means, and it sets the automatic shut-off time and the electric energy saving shifting time. The automatic shut-off is a control which performs to shift to the waiting condition after the passage of the set time. The automatic shut-off control of the present embodiment of the invention is a control by which the apparatus is shifted to the waiting condition, and is performed after the passage of a prescribed period from the completion of the warm-up of fixing device 8 in FIG. 1 or the completion of the image formation. Incidentally, between the time from the completion of the warm-up or the image formation to the time having passed for the prescribed time, it is in the idling condition. The shut-off control will be performed concretely as follows.

Step 1: To lower the temperature of the fixing device 8.

When the temperature of the fixing device 8 is lowered, power consumption is lowered, and deterioration of the parts which constitute the fixing device 8 such as a heating roller are prevented. Incidentally, the control is performed by a printing order to lower the temperature of the fixing device 8 to the level from which the printing process can be started immediately.

Step 2: To set the transfer devices 45Y, 45M and 45C to the waiting condition.

When the full color priority mode is set as mentioned above, the control means 100 controls by the automatic shut-off control so that the transfer devices 45Y, 45M and 45C make the photoreceptors 41Y, 41M and 41C respectively to be press-contacted with the intermediate transfer member 1. Further, when the black and white priority mode is set, the control means 100 controls by the automatic shut-off control so that the transfer devices 45Y, 45M and 45C make the photoreceptors 41Y, 41M and 41C respectively to be separated from the intermediate transfer member 1.

Step 3: To stop the polygons 434Y, 434M, 434C and 434K which are in the operating conditions.

With regard to setting of automatic set-off time for the polygons 434Y, 434M, 434C and 434K, it is possible to make the polygons 434Y, 434M and 434C to be one group, and to make the polygon 434K to be another group, and thereby to set an automatic shut-off time for each group to be different from others.

For example, the automatic shut-off time is structured to be capable of being set to four steps representing one minute, five minutes, 30 minutes and non-automatic shut-off so that the automatic shut-off time can be selected independently from these steps concerning the group of the polygons 434Y, 434M and 434C and the group of the polygon 434K. Due to this, the polygon is not operated unnecessarily, and thereby, power consumption is controlled and a noise can be prevented. For example, a user who often makes the black and white images can reduce the number of times of operation/stop cycles of the polygon, by setting the shut-off time of the polygon 434K longer than that of the polygons 434Y, 434M and 434C. Incidentally, it is preferable for a user who often makes the multicolor image to set the automatic shut-off time of the polygons 434Y, 434M and 434C longer than that of the polygon 434K.

Time setting means 103 establishes the time for shifting to an energy saving mode. For example, it is possible to establish the time for shifting in the scope from 30 minutes to three hours.

Indicated by numeral 104 is a network interface which communicates with an external apparatus via a network, and the control means 100 starts printing with a print command which is received via the network interface.

FIG. 4 shows the start timings of the polygon 434Y of the exposure device 43Y, the polygon 434M of the exposure device 43M, the polygon 434C of the exposure device 43C and the polygon 434K of the exposure device 43K. The starts of these polygons for full color print are performed under the timing shown in FIG. 4 (*a*). That is, the polygon 434Y is started firstly, after the prescribed time ΔT, the polygon 434M is started, and after the prescribed time ΔT, the polygon 434C is started, and further after the prescribed time ΔT, the polygon 434K is started. It is preferable to set the prescribed time ΔT to be in the scope from 100 ms to 500 ms, for example, to be 200 ms. The rush currents which occur at the starts of the polygons are prevented by this time difference, that is, they are spread.

At the start of the color image printing process, firstly, the polygon 434Y is started, and after the rise time of t1–t2, the rotation of the polygon reaches the constant speed. After having reached the constant speed, the Y laser representing the laser light source of the exposure device 43Y for the Y image is driven at the time t3 to perform the writing of the Y image. The M laser, C laser and K laser are driven in the same manner as Y laser, to perform the writings of the M image, C image and K image.

FIG. 4 (*b*) shows the timing of the starts of the polygons 434Y, 434M, 434C and 434K for the black and white print. In the case of the black and white printing as shown in FIG. 4(*b*), each starting is performed in the order of 434K, 434Y, 434M and 434C of the polygons, that is, the polygon 434K is started first.

In the black and white printing, the polygon 434K is started at the time of t1, and after the rise time of t1–t2, its rotation shifts to the constant speed rotation. The laser light source of the exposure device 43K for the K image is driven to perform the writing after the polygon 434K have shifted to the constant speed rotation.

At the start of the continuous printing process forming a plurality of the images, the control means 100 selects the starting control shown in FIG. 4 (*a*) and FIG. 4 (*b*), depending on whether the first image is full color or black and white. When the first image is full color, FIG. 4 (*a*) is selected, and when it is black and white, FIG. 4 (*b*) is selected. The reason why the polygons 434Y, 434M, and 434C are started in the black and white printing is to form a ready-to-write condition for the polygons other than the polygon 434K, for preparing for the possibility that the color image will be formed on the occasion after the first black and white image or on the next but one occasion, even if the first image is black and white. The prescribed time ΔT for the start of each polygon in FIG. 4 (*b*), that is, the time difference is set to be about 200 μsec.

A press-contact control of the transfer devices 45Y, 45M, and 45C by the control means 100 will be explained referring to FIG. 5.

Judgment for the start of the warm-up shown in block F1 is judgment to discriminate whether it is the time to turn on a main switch (not shown) of the image forming apparatus, or it is the time to end the print process. After turning on the main switch, it is judged to be Y (YES) in F1, but it is judged to be N (NO), in judgment after the printing process is completed.

When the main switch is turned on, the priority mode is checked. As mentioned above, in the setting that the full color mode is selected as the priority mode (color in block F2), the transfer devices 45Y, 45M and 45C representing the primary transfer devices are controlled to be press-contacted so that the image forming bodies 41Y, 41M, and 41C may be press-contacted with the intermediate transfer member 1. In the setting that the black and white mode is selected as the priority mode (black and white in block F2), the transfer devices 45Y, 45M and 45C are released from the press-contact so that the photoreceptors 41Y, 41M and 41C are separated from the intermediate transfer member 1. Incidentally, as the transfer device 45K is beyond the press-contact control as mentioned above, it is under the press-contact condition.

The control will be divided as follows in accordance with the print starting command from an operation of the start button 102 or from the network interface 104 (Y in F5).

In the case that the full color print is commanded in the full color priority mode or the black and white print is commanded in the black and white priority mode, no process is performed about the press-contact control of the transfer device.

When the black and white print is commanded in the full color priority mode (Y of F6), the control of releasing the press-contact of the transfer devices 45Y, 45M and 45C is performed in the block F8. When the full color is commanded in the black and white priority mode (Y of F7), the transfer devices 45Y, 45M and 45C are press-contacted (F9).

The automatic shut-off control is performed when the prescribed time has passed after the end of the print of the full color print or the black and white print, or when the prescribed time has passed after the completion of the warm-up of the fixing device 8 shown in FIG. 1 (Y in F10). The automatic shut-off is control to lower power consumption and to prevent deterioration of constituent parts of the fixing device such as a heating roller, by lowering a temperature of the fixing device 8, and in the present embodiment of the invention, there are conducted the above-mentioned control of the fixing device, and control to return the transfer device to the condition based on the established priority mode.

That is, when the time set by the time setting means 103 has passed, if the printing is performed in the mode which is different from the priority mode, like an occasion where the black and white printing is performed in the full color priority mode (F12), or the full color printing is performed in the black and white priority mode (F13), the press contact for each of the transfer devices 45Y, 45M, and 45C is performed (F14), or the release of the press contact for each of the transfer devices 45Y, 45M and 45C is performed (F15), for each printing.

As mentioned above, the automatic shut-off time is set to be from a few minutes to dozens of minutes, however for the time of shifting to the energy saving mode, it is set to the longer time from thirty minutes to three hours. After the passage of the energy saving mode time, that is, when the energy saving condition is established (Y in F16), the press contacts of the transfer devices 45Y, 45M and 45C are released, and the flow chart advances to the energy saving mode in which the power supply to the fixing device 8 and other constituent sections is cut and power is supplied only to the control means 100 to enter the energy saving mode, which is not illustrated.

The start control of the polygons 434Y, 434M and 434C by the control means 100 will be explained in FIG. 6.

When the printing command is given (Y in F20), the polygons are started in the order of 434Y, 434M, 434C and 434K at the interval of the prescribed time ΔT (F22) for the full color printing (color in F21). Further, the polygons are started in the order of 434K, 434Y, 434M and 434C at the interval of the prescribed time ΔT for the black and white printing (black and white in F21).

After the completion of printing, when the automatic shut-off time T1 which is set for the polygons 434Y, 434M and 434C has passed, these polygons for colors aforesaid stop rotating, and when the automatic shut-off time T2 which is set for the polygon 434K has passed, the polygon for black, that is, the polygon 434K stops rotating (F24).

Preferred embodiments of the present invention have been described in detail above, the various embodiments are also available within the scope of the described structures. For example, in the invention described in (1)–(3), an LED exposure device composed of a light emitting diode array and an image-forming lens can be used for the exposure device which writes an image on the image forming member. Further in the invention described in (4)–(6), a known and optional charging device such as a corotron charger can be used instead of the transfer roller as the primary transfer means which transfers a toner image on the image forming member onto the intermediate transfer member.

Still further, the present invention is applicable not only to the full color image forming apparatus which forms a full color image but also to an image forming apparatus for a multicolor image that is composed of monochromatic images in an arbitrary number of types in terms of color.

EFFECT OF THE INVENTION

In the invention of (1) or (2), in the case of a user who forms a full color image frequently, the multicolor image formation is performed without passing through the preparation process to make the image forming bodies to be press-contacted with the intermediate transfer member, because every image forming member is press-contacted with the intermediate transfer member in the waiting condition, and in the case of a user who forms a monochromatic image frequently, the monochromatic image formation is performed without passing through the preparation process to make the image forming bodies for the recording images to be press-contacted with the intermediate transfer member. Accordingly, most of the real image forming operation is performed by the short FCOT in terms of the image forming process, and image forming efficiency is improved greatly.

The invention of (3) makes it possible to prevent deformation of the intermediate transfer member and an influence on the image forming member which are caused when the image forming member and the intermediate transfer member are left to be in the press-contacted condition for a long time.

In the invention of (4), since the concentration of the rush currents caused by at the start of the polygon mirror which deflects the light beam from the laser light source is prevented, power of the driving circuit for the polygon driving motor can be reduced by the amount needed only for the rush currents, resulting in cost reduction.

The invention of (5) makes it possible to obtain the shortest FCOT for both of the multicolor image forming process and the monochromatic image forming process, and thereby to conduct image formation at high efficiency.

In the invention of (6), the automatic shut-off time for the polygon mirrors of the exposure devices for the secondary images such as those of Y, M, and C, and that for the polygon mirror of the exposure device for the primary image such as the black image, for example, can be set on an optimal basis in accordance with an objective for use of a user, which makes it possible for each user to establish the image forming conditions which will have the highest image forming efficiency for the user.

What is claimed is:

1. A multicolor image forming apparatus for conducting a multicolor image forming process to form a multicolor image or a monochromatic image forming process to form a monochromatic image, comprising:

a first image forming unit having a first image forming member, a first image forming section for forming a first toner image on the first image forming member, and a first primary transfer section;

a second image forming unit having a second image forming member, a second image forming section for forming a second toner image on the second image forming member, and a second primary transfer section;

an intermediate transfer member for carrying a toner image that is transferred from at least one of the first and second image forming members;

a secondary transfer section for transferring the toner image from the intermediate transfer member onto a recording material;

a command section to command one of a multicolor image forming operation and a monochrome image forming operation for respective image forming jobs;

a priority mode setting section for setting a multicolor priority mode or a monochrome priority mode; and a controller to control in such a way that in an idling condition and in a waiting condition, when the multicolor priority mode is set, the first and the second image forming members are in press-contact with the intermediate transfer member, and when the monochrome priority mode is set, only the first image forming member is in press-contact with the intermediate transfer member.

2. The multicolor image forming apparatus described in claim 1, wherein each of the primary transfer sections comprises a transfer roller to which a transfer voltage is applied, and wherein each of the image forming members is press-contacted with or separated from the intermediate transfer member according to a displacement of each of the transfer rollers.

3. The multicolor image forming apparatus described in claim 1, wherein the controller controls the second image forming member to be separated from the intermediate transfer member when the waiting condition has been kept for a prescribed time period.

4. A multicolor image forming apparatus comprising:

an image forming member;

a first image exposure device having a first laser light source and a first polygon mirror to deflect a light beam from the first laser light source;

a second image exposure device having a second laser light source and a second polygon mirror to deflect a light beam from the second laser light source;

an image forming section for forming a toner image on the image forming member; and a controller to control the first polygon mirror and the second polygon mirror to start up respective rotation in succession at a time interval.

5. The multicolor image forming apparatus described in claim 4, wherein the controller controls the first polygon mirror to start up rotation after the second polygon mirror when the first image to be formed is a multicolor image, and wherein the controller controls the first polygon mirror to start up rotation first when the first image to be formed is a monochromatic image.

6. The multicolor image forming apparatus described in claim 4, wherein the time interval is 100 to 500 milliseconds.

7. A multicolor image forming apparatus comprising:

an image forming member;

a first image exposure device having a first laser light source and a first polygon mirror to deflect a light beam from the first laser light source;

a second image exposure device having a second laser light source and a second polygon mirror to deflect a light beam from the second laser light source;

an image forming section for forming a toner image on the image forming member; and a time setting section for setting an automatic shutoff time to shut off the first and the second polygon mirrors, wherein the automatic shut-off time for the first polygon mirror and the automatic shut-off time for the second polygon mirror can be set to be different from each other.

* * * * *